US005648436A

United States Patent [19]
Janowitz et al.

[11] Patent Number: 5,648,436
[45] Date of Patent: Jul. 15, 1997

[54] HALOGEN-FREE MIXTURE, A SELF-EXTINGUISHING PREPREG CONTAINING THIS MIXTURE AND THE USE OF SUCH A PREPREG

[75] Inventors: Othmar Janowitz, Vienna; Peter Walter, Brunn, both of Austria

[73] Assignee: Isovolta Osterreichische Isolierstoffwerke Aktiengesellschaft

[21] Appl. No.: 454,193

[22] PCT Filed: Oct. 20, 1994

[86] PCT No.: PCT/AT94/00154

§ 371 Date: Jun. 19, 1995

§ 102(e) Date: Jun. 19, 1995

[87] PCT Pub. No.: WO95/11272

PCT Pub. Date: Apr. 27, 1995

[30] Foreign Application Priority Data

Oct. 21, 1993 [AT] Austria ................................. 2132/93

[51] Int. Cl.$^6$ ............................ C08L 63/04; C08L 61/06
[52] U.S. Cl. ..................... 525/481; 525/482; 525/485; 525/506; 525/507; 524/404; 524/405
[58] Field of Search ............................. 525/507, 481, 525/482, 485, 506; 524/404, 405

[56] References Cited

U.S. PATENT DOCUMENTS

| | | |
|---|---|---|
| 2,785,144 | 3/1957 | Wachter ................................. 260/29.3 |
| 5,019,605 | 5/1991 | Jannic ..................................... 523/219 |
| 5,059,637 | 10/1991 | Langer ................................... 523/179 |

FOREIGN PATENT DOCUMENTS

| | | | |
|---|---|---|---|
| 0 308 290 | 3/1989 | European Pat. Off. | C08K 3/38 |
| 0 459 951 | 4/1991 | European Pat. Off. | C08L 63/00 |
| 61233049 | 10/1986 | Japan | C08L 63/00 |

OTHER PUBLICATIONS

*Chemical Abstracts*, vol. 106, No. 2, 1 Jun. 1987, Columbus, Ohio, US; Abstract No. 177805, "Epoxy Resin Potting Compositions".

*Primary Examiner*—W. Robinson H. Clark
*Attorney, Agent, or Firm*—Bacon & Thomas

[57] ABSTRACT

A halogen-free resin mixture comprising an epoxy resin, a hardener, a flame retardant as well as additives, a self-extinguishing prepreg composed of this resin mixture as well as its advantageous application, particularly as an insulation material. The halogen-free resin mixture being composed of:

a) 20–60 weight % epoxy resin;
b) 20–60 weight % phenolic novolak hardener;
c) 5–65 weight % zinc borate as flame retardant; and
d) 0–30 weight % additives.

21 Claims, No Drawings

HALOGEN-FREE MIXTURE, A SELF-EXTINGUISHING PREPREG CONTAINING THIS MIXTURE AND THE USE OF SUCH A PREPREG

TECHNICAL FIELD

The invention relates to a halogen-free resin mixture comprising an epoxy resin, a hardener, a flame retardant as well as additives, a self-extinguishing prepreg consisting of this resin mixture as well as its advantageous application, particularly as an insulation material.

STATE OF THE ART

European Patent EP-A-365784 teaches the preparation of resin mixtures consisting of an epoxy resin with flame retardants in order to make fire-resistant semi-finished products (prepregs). As flame retardants, halogen-free phosphorus and nitrogen compounds are suggested. These flame retardants however have the disadvantage, that in the instance of fire they disintegrate releasing corrosive and partly toxic compounds like nitrogen oxide and derivatives of phosphoric acid, which during the use of the preparation cause corrosion damage of machine parts.

The use of flame retardants like magnesium hydroxide and zinc carbonate is also possible, because it is known that they do not form any corrosive products on disintegration in the instance of fire. However, semi-finished products (prepregs) consisting of a resin of the type mentioned hereinabove under use of the flame retardants do not fulfil either the high requirements with respect to resistance against fire nor can they be formed into laminates with permanent temperature resistance during hardening (greater or equal to thermal class F).

Further, prepregs of the type mentioned above have to fulfil high requirements with respect to their application. An important criterion for their use are their adhesive properties. Especially in mechanical engineering such type of semi-finished products (prepregs) constitute important connecting elements between individual machine parts as well as between the used material, whereby a rigid stable connection between the individual machine parts or materials is to be achieved.

Therefore an object of the invention is to provide a halogen-free resin mixture of the type mentioned hereinabove, which provides prepregs that do not exhibit known disadvantages like the release of corrosive or toxic compounds in the instance of fire and at the same time have a high fire resistance and permanent temperature resistance as well as good adhesive properties. For the solution of this problem, according to the invention there is provided a halogen-free resin mixture composed of:

a) 20–60 weight % epoxy resin;
 b) 20–60 weight % phenolic novolak hardener;
 c) 5–65 weight % zinc borate as flame retardant; and
 d) 0–30 weight % additives.

Preferably, this resin mixture contains as epoxy resin one of the type of an epoxidised phenol novolak or kresol novolak.

Further the invention relates to a self extinguishing prepreg with a resin mixture content of 40–200% produceable by application of a halogen-free resin mixture composed of:

a) 20–60 weight % epoxy resin;
 b) 20–60 weight % phenolic novolak hardener;
 c) 5–65 weight % zinc borate as flame retardant; and
 d) 0–30 weight % additives. on plane carrier materials.

Advantageously, the self extinguishing prepreg has a resin mixture content of 40 to 140 percent.

Preferably, glass fibers, aramide fibers and acryl fibers are used as carrier materials. These are advantageously used in the form of a web of fibers, a fabric or a fleece.

Further the carrier material may be in the form of a plastic foil. Especially good properties of prepregs are reached when the epoxy resin is one of the type of an epoxidised phenol novolak or kresol novolak.

Advantageously the prepreg according to the invention is used as an insulation material in electrical machines and converters.

A METHOD FOR EXECUTION OF THE INVENTION

An impregnating resin mixture according to the invention has the following constituents:

| Main Components | Quantity | |
|---|---|---|
| Epoxy novolak/solid resin content | 75% | 118 g |
| Phenolic novolak hardener/solid resin content | 65% | 203 g |
| zinc borate | | 100 g |

As additives, an amorphous silicon dioxide (trademark name Aerosil) to an extent of 2 g and an accelerator, e.g. benzyldimethyl amine in a quantity of 0.2 g are added.

The above mentioned ingredients are introduced in the form of an acetonic suspension on a glass filament fabric (200 g/m square) and are dried in a vertical dryer at temperatures up to 170° C. (prepreg A).

Instead of the above used zinc borate, now in the same quantity the following surface flame retardants are used; Magnesium hydroxide (prepreg B), zinc carbonate (prepreg C).

In the following table results of comparison tests concerning the prepreg A according to the invention and the prepregs B and C known from the prior art are compared.

| | Prepreg | | |
|---|---|---|---|
| | A | B | C |
| Fire resistance measuring method 1 | V0 | V1 | V1 |
| Fire resistance measuring method 1 | class A | class B | class B |
| Permanent temperature resistance | >155° C. | <155° C. | <155° C. |
| Adhesive property measured on the tension shear resistance (N/mm square) | 3.2 | 2.2 | 2.7 |

The values stated in the table with respect to the fire resistance were determined as follows:

According to the measuring method 1 the fire test was carried out on a laminate, which was manufacture from 8 layers of prepregs A to C by compressing at increased temperature, whereby the resins used were hardened to a great extent.

The measuring method 2 was carried out on the unhardened prepregs A to C according to NEMA II 1-11.11.

The permanent temperature resistance as tested on a 3 mm thick laminate, which was manufactured from 16 layers of the prepregs through hot compression according to IEC 243. The test criterion is the bending strength according to DIN 7735 at room temperature.

The tension shear strength was measured at room temperature on composites consisting respectively of the prepregs A to C, which were compressed on both sides with 0.4 mm thick untreated copper plates.

In the comparison of the values stated in the table it is observed that the prepregs A according to the invention shows better properties with respect to fire resistance namely Class A as well as a better permanent temperature resistance namely >155° C. than the prepregs B and C known from the technology, whereby prepregs B contains magnesium hydroxide as flame retardant and prepreg C zinc carbonate. The measurement values concerning the tension-shear strength shows that the prepreg according to the invention has adhesive properties at least as good as similar, non-flame protected prepregs and better adhesive properties than the known flame protected prepregs B and C.

PROFESSIONAL APPLICABILITY

The self-extinguishing prepreg A is further suitable for use as an insulation material in electrical machines and converters, especially transformers. The breakdown strength serves as an important testing criterion for this application purpose. This is usually measured on one layer of the hardened prepreg according to IEC 243. Hereby a breakdown resistance of greater than 30 kv/mm was determined. This test value corresponds to the requirements, which have to be fulfilled by the insulation materials for electrical machines and converters.

We claim:

1. A halogen-free resin mixture comprising:

a) 20–60 weight % epoxy resin;

b) 20–60 weight % phenolic novolak hardener; and c) 5–65 weight % zinc borate as flame retardant.

2. A resin mixture as claimed in claim 1, wherein the epoxy resin is an epoxidised phenol novolak.

3. A resin mixture as claimed in claim 1, wherein the epoxy resin is an epoxidised kresol novolak.

4. A self-extinguishing prepreg on a carrier material, wherein said resin mixture comprises:

a) 20–60 weight % epoxy resin;

b) 20–60 weight % phenolic novolak hardener; and c) 5–65 weight % zinc borate as flame retardant and said resin mixture is present on said carrier in an amount of 40%–200% relative to the amount of carrier material.

5. A self-extinguishing prepreg as claimed in claim 4, wherein the resin mixture content is 40 to 140%.

6. A self-extinguishing prepreg as claimed in claim 4, wherein the carrier material is composed of glass fibers and/or aramide and/or acryl fibers.

7. A self-extinguishing preparation as claimed in claim 4, wherein the carrier materials are arranged in the form of a web of fibers, a fabric or fleece.

8. A self-extinguishing prepreg as claimed in claim 4, wherein the carrier material is composed of a plastic foil.

9. A self-extinguishing preparation as claimed in claim 4 wherein the epoxy resin is an epoxidised phenolic novolak.

10. A self-extinguishing preparation as claimed in claim 4, wherein the epoxy resin is an epoxidised kresol novolak.

11. An insulation material for electrical machines and converters comprising a self-extinguishing prepreg as claimed in claim 4.

12. The resin mixture of claim 1 which further includes an additive in an amount up to 30 weight % wherein said additive is selected from the group consisting of amorphous silicon dioxide and benzyldimethylamine.

13. The resin mixture of claim 12 wherein the epoxy resin is an epoxidised phenol novolak.

14. The resin mixture of claim 12 wherein the epoxy resin is an epoxidised kresol novolak.

15. The self-extinguishing prepreg of claim 4 wherein said resin mixture includes an additive in an amount up to 30 weight % wherein said additive is selected from the group consisting of amorphous silicon dioxide and benzyldimethylamine.

16. A self-extinguishing prepreg as claim in claim 15, wherein the resin mixture is 40 to 140%.

17. A self-extinguishing prepreg as claimed in claim 15, wherein the carrier material is composed of glass fibers and/or aramide and/or acryl fibers.

18. A self-extinguishing preparation as claimed in claim 15, wherein the carrier material is arranged in the form of a web of fibers, a fabric or fleece.

19. A self-extinguishing prepreg as claimed in claim 15, wherein the carrier material is composed of a plastic foil.

20. A self-extinguishing preparation as claimed in claim 15, wherein the epoxy resin is an epoxidised phenolic novolak.

21. A self-extinguishing preparation as claimed in claim 15, wherein the epoxy resin is an epoxidised kresol novolak.

* * * * *

UNITED STATES PATENT AND TRADEMARK OFFICE
CERTIFICATE OF CORRECTION

PATENT NO. : 5,648,436
DATED : July 15, 1997
INVENTOR(S) : Othmar Janowitz, Vienna; Peter Walter, Brunn, Both of Austria It is certified that error appears in the above-identified patent and that said Letters Patent is hereby corrected as shown below:

In claim 7, line 1, replace "preparation" with --prepeg--.

In claim 9, line 1, replace "preparation" with --prepeg--.

In claim 10, line 1, replace "preparation" with --prepeg--.

In claim 18, line 1, replace "preparation" with --prepeg--.

In claim 20, line 1, replace "preparation" with --prepeg--.

In claim 21, line 1, replace "preparation" with --prepeg--.

In claim 16, line 1, replace "as claim" with --as claimed--.

Signed and Sealed this

Eleventh Day of November, 1997

*Attest:*

BRUCE LEHMAN

*Attesting Officer*  *Commissioner of Patents and Trademarks*